No. 804,434. PATENTED NOV. 14, 1905.
A. ROSENTHAL.
CORN HUSKER AND ENSILAGE CUTTER.
APPLICATION FILED OCT. 17, 1902.

7 SHEETS—SHEET 3.

No. 804,434. PATENTED NOV. 14, 1905.
A. ROSENTHAL.
CORN HUSKER AND ENSILAGE CUTTER.
APPLICATION FILED OCT. 17, 1902.

7 SHEETS—SHEET 4.

Witnesses.
C. H. Keeney
Anna C. Faust

Inventor.
August Rosenthal,
By Benedict, Morsell & Green
Attorneys.

No. 804,434. PATENTED NOV. 14, 1905.
A. ROSENTHAL.
CORN HUSKER AND ENSILAGE CUTTER.
APPLICATION FILED OCT. 17, 1902.
7 SHEETS—SHEET 5.
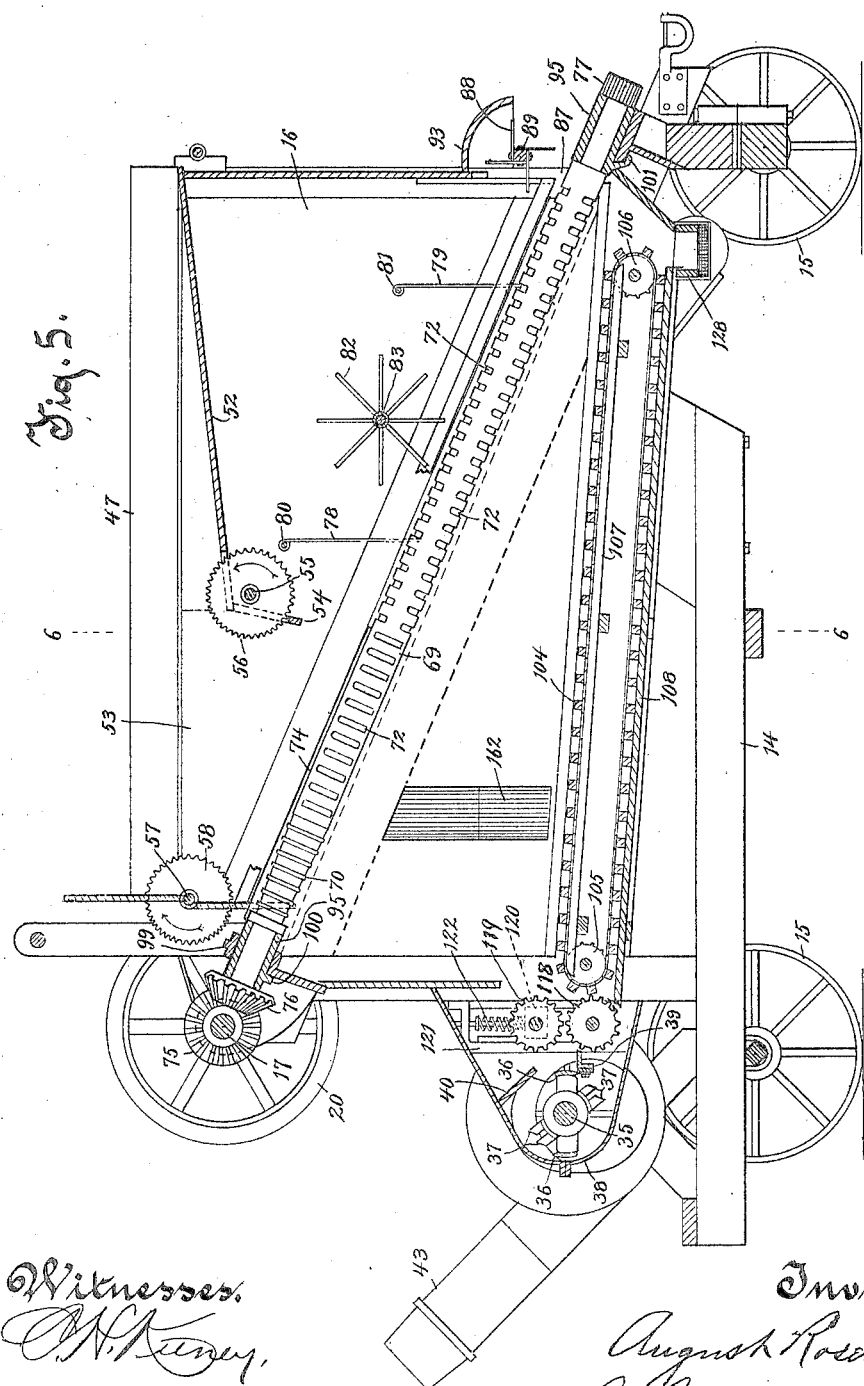

No. 804,434. PATENTED NOV. 14, 1905.
A. ROSENTHAL.
CORN HUSKER AND ENSILAGE CUTTER.
APPLICATION FILED OCT. 17, 1902.

7 SHEETS—SHEET 6.

Witnesses.
Inventor.
August Rosenthal
By Benedict, Morsell & Green
Attorneys.

No. 804,434. PATENTED NOV. 14, 1905.
A. ROSENTHAL.
CORN HUSKER AND ENSILAGE CUTTER.
APPLICATION FILED OCT. 17, 1902.
7 SHEETS—SHEET 7.
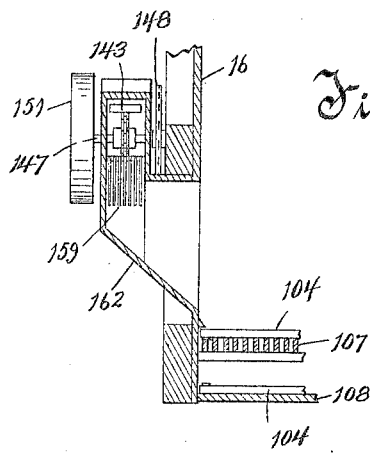
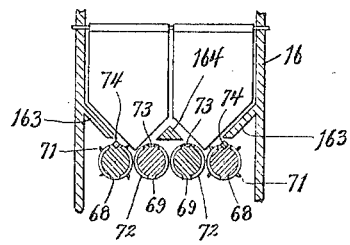
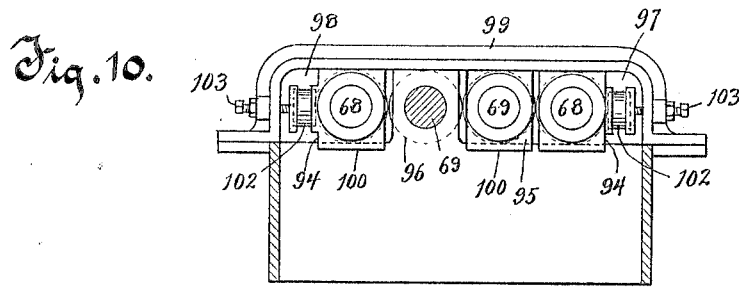
Witnesses.
C. H. Keeney.
Anna O. Faust.
Inventor.
August Rosenthal
By Benedict, Morsell & Green.
Attorneys.

UNITED STATES PATENT OFFICE.

AUGUST ROSENTHAL, OF MILWAUKEE, WISCONSIN, ASSIGNOR TO ROSENTHAL MANUFACTURING COMPANY, OF MILWAUKEE, WISCONSIN.

CORN-HUSKER AND ENSILAGE-CUTTER.

No. 804,434.　　　Specification of Letters Patent.　　　Patented Nov. 14, 1905.

Application filed October 17, 1902. Serial No. 127,632.

*To all whom it may concern:*

Be it known that I, AUGUST ROSENTHAL, residing at Milwaukee, in the county of Milwaukee and State of Wisconsin, have invented a new and useful Improvement in Corn-Huskers and Ensilage-Cutters, of which the following is a description, reference being had to the accompanying drawings, which are a part of this specification.

My invention has relation to improvements in corn-huskers and ensilage-cutters.

The primary object of the invention is to promote the general efficiency of the machine as a whole, whereby the mechanism and mode of operation are simplified.

A further object is the provision of means whereby any shelled kernels of corn which may pass between and below the husking-rolls in the travel of the ears along said rolls are prevented from passing to the cutting and blowing mechanisms and compelled to travel to a special point of discharge, and during the course of such travel are subjected to the action of mechanism for separating all dross or dirt and lighter particles therefrom.

With the above and other incidental objects in view the invention consists of the devices and parts or their equivalents, as hereinafter set forth.

Figure 1:
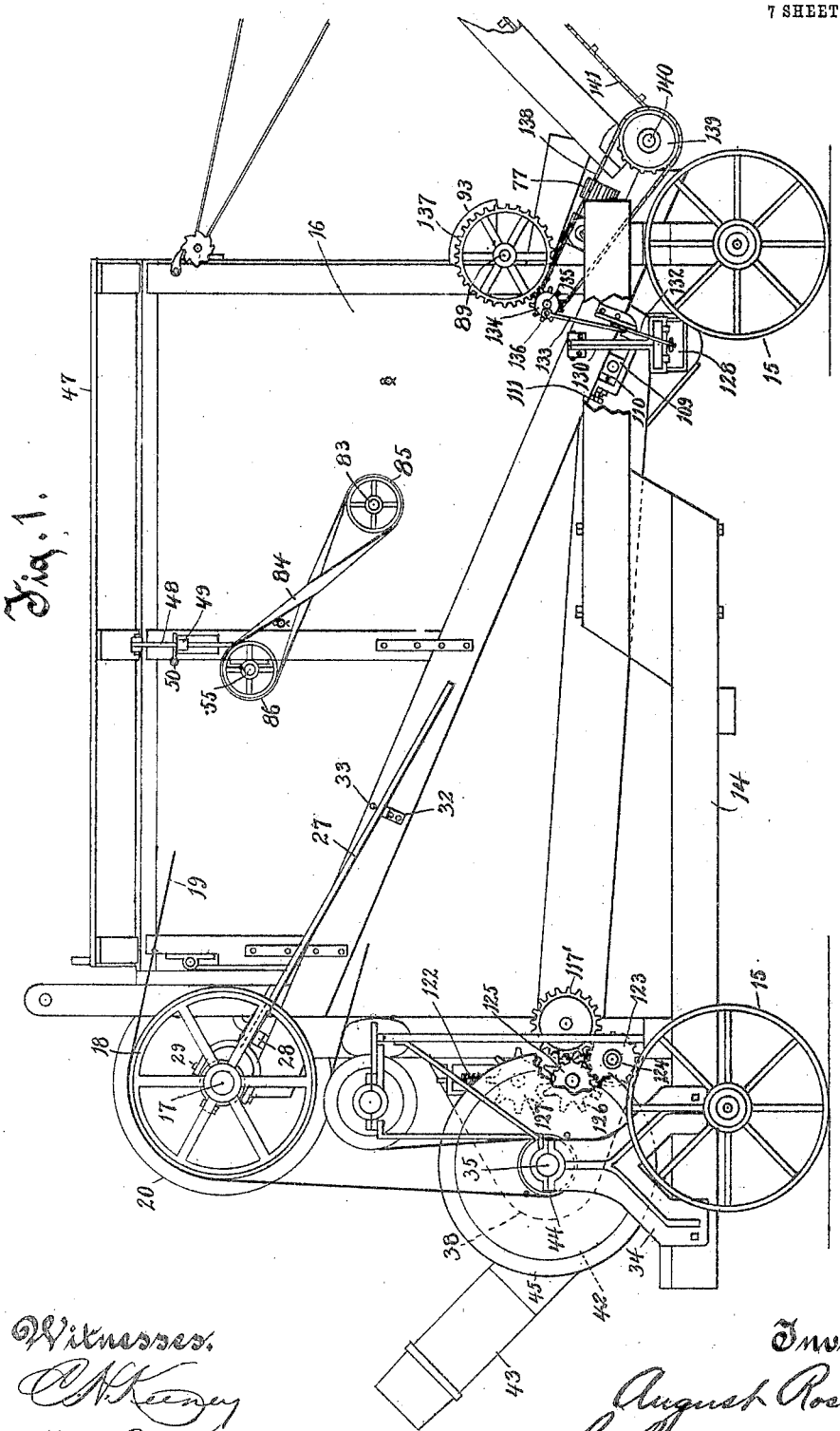
Figure 2:
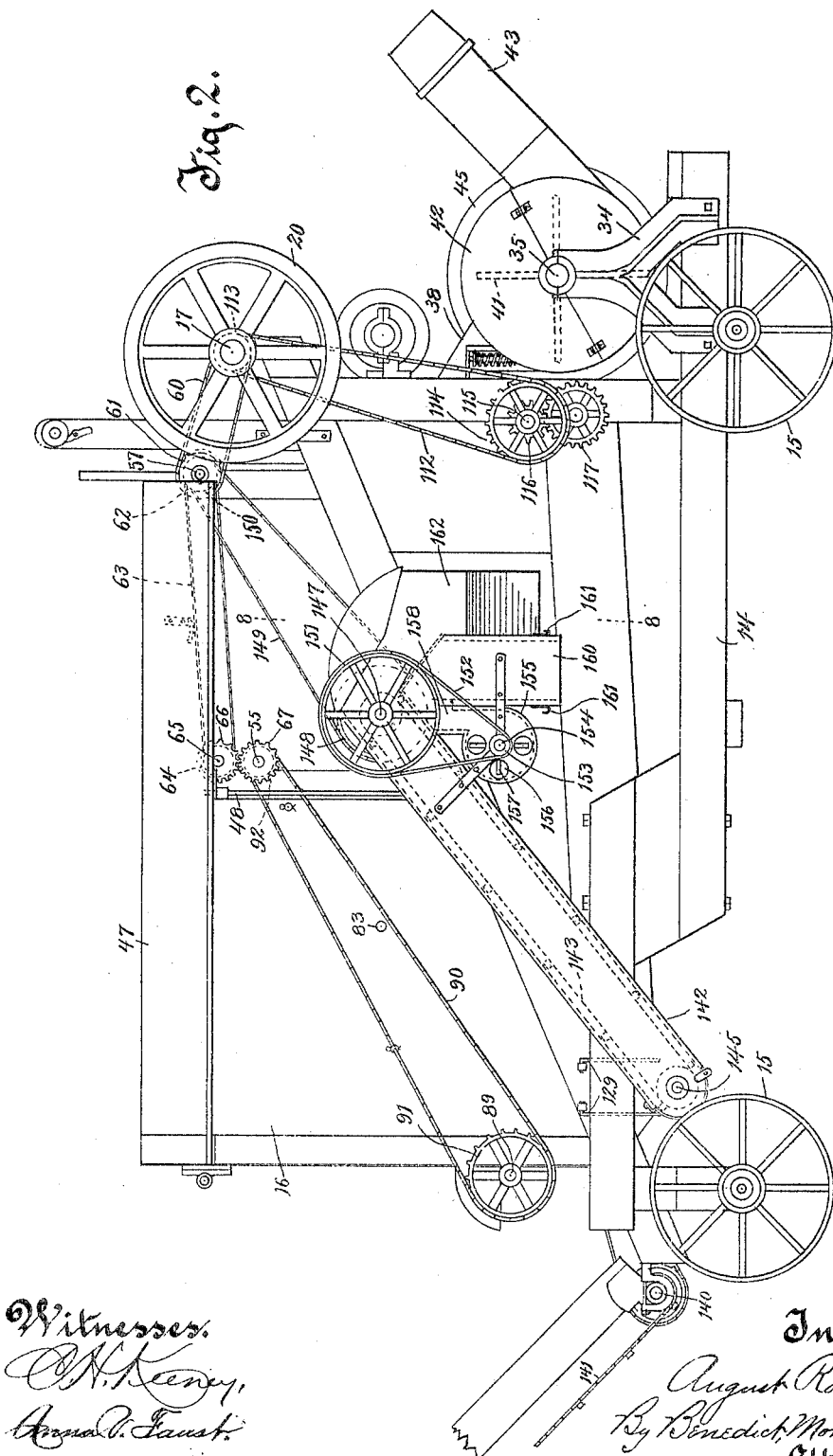
Figure 3:
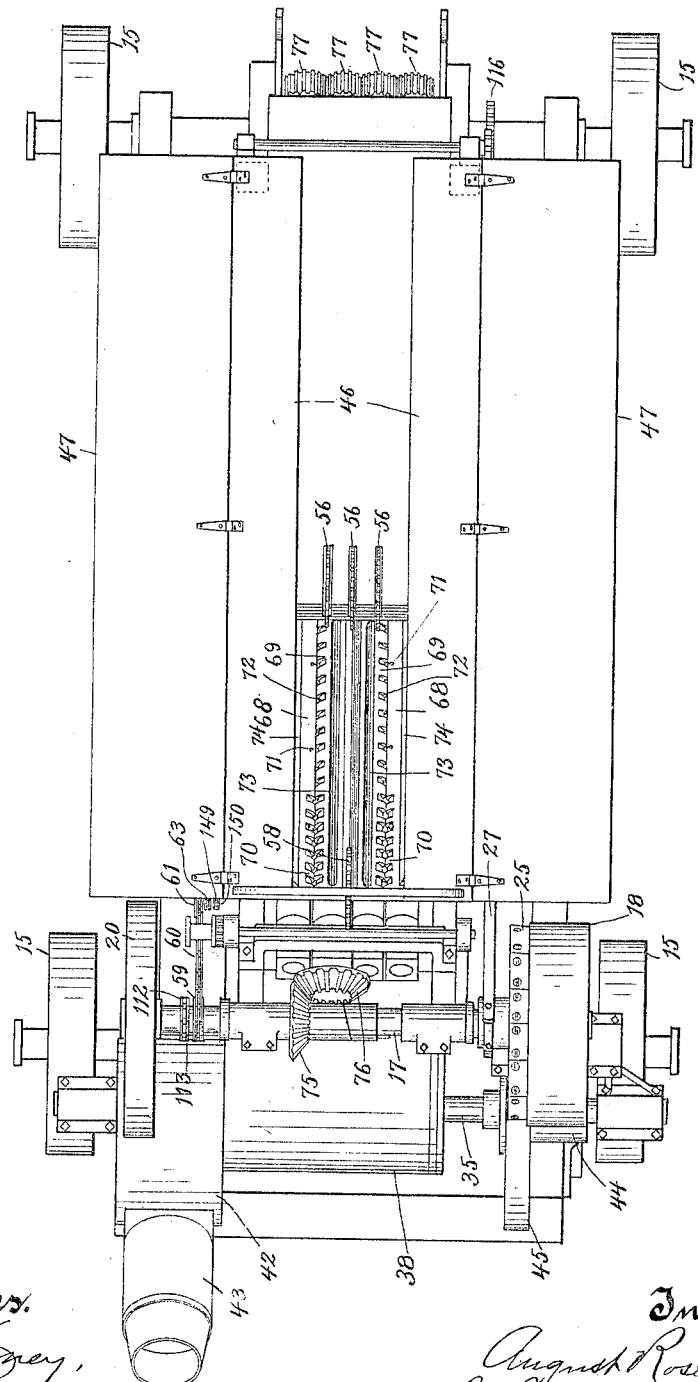
Figure 4:
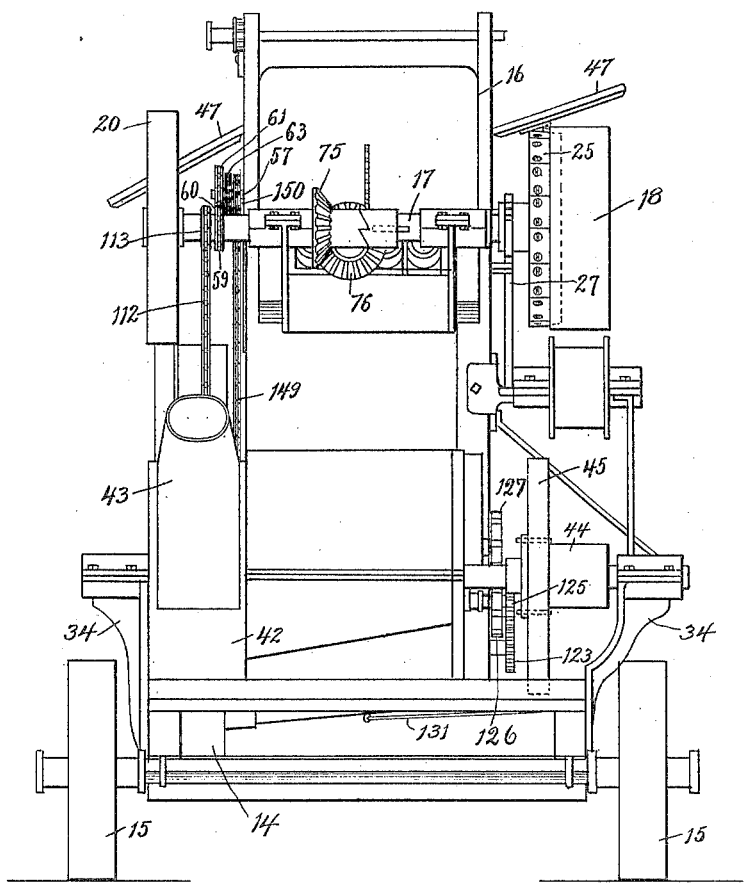
Figure 13:
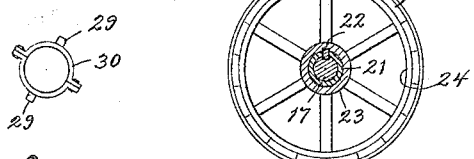
Figure 11:
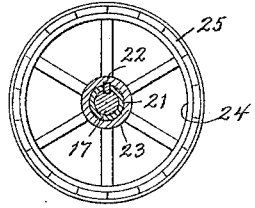
Figure 12:
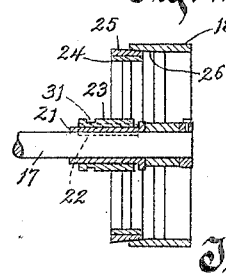
Figure 6:
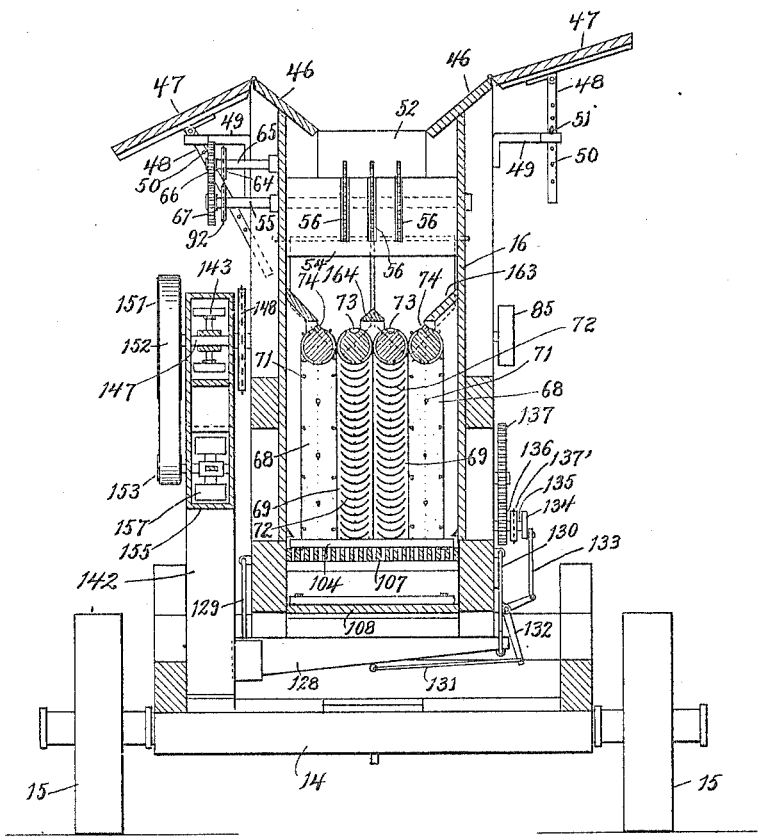
Figure 7:
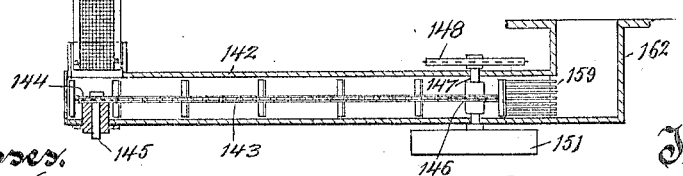

In the accompanying drawings, Figure 1 is a side elevation of the complete machine, parts broken away. Fig. 2 is an elevation of the opposite side. Fig. 3 is a plan view of the complete machine. Fig. 4 is a rear end view. Fig. 5 is a longitudinal central section. Fig. 6 is a cross-section on the line 6 6 of Fig. 5. Fig. 7 is a view of a fragment of the machine, showing one of the conveyers, said conveyer being in longitudinal section. Fig. 8 is a fragment on the line 8 8 of Fig. 2. Fig. 9 is a cross-section of the hopper and rolls. Fig. 10 is an end view of the bearing-boxes at the ends of the journals of the husking-rolls. Fig. 11 is a view of the main-belt pulley and the clutch mechanism in connection therewith. Fig. 12 is a transverse section of Fig. 11, and Fig. 13 is a detail view of a portion of the clutch mechanism.

Referring to the drawings, the numeral 14 indicates the lower portion or truck of the machine, which for the sake of portability is preferably mounted upon wheels 15. Mounted upon the truck is a box-like structure or frame 16, preferably of rectangular form, and within which is contained the principal parts of the operating mechanism.

Outside of and parallel with one end of the frame and supported in suitable bearings is the main drive-shaft 17, upon one end of which is a pulley 18. Around this pulley passes a belt 19, leading from any suitable source of power. Upon the opposite end of shaft 17 is a fly-wheel 20. Pulley 18 is preferably mounted on shaft 17, so as to run fast or loose thereon. This is accomplished by suitable clutch mechanism. (Shown most clearly in Figs. 11, 12, and 13 of the drawings.) Referring to this mechanism, the numeral 21 indicates a sleeve, which is keyed to the shaft by means of a key 22. Surrounding sleeve 21 is an outer sleeve 23, and into this sleeve extends the key 22, so that said key not only serves to fixedly secure sleeve 21 to the shaft, but also secures sleeve 23 slidingly to said sleeve 21. The outer sleeve 23 forms the hub of a wheel 24, the periphery of said wheel being beveled downwardly outwardly. This beveled periphery is preferably formed or made up of a series of beveled blocks 25, placed end to end and secured to and around the periphery proper of the wheel, as most clearly shown in Figs. 3 and 4. The beveled periphery of wheel 24 matches and is adapted to be moved into and out of engagement with the under beveled surface 26 of the pulley 18. The sliding movement of the sleeve 23 and the wheel 24, of which said sleeve forms the hub, is effected by means of a lever 27, which is pivoted at the point 28. The outer end of this lever is bifurcated or forked, and the furcate arms are apertured to receive lugs 29 29, extending from diametrically opposite points of a ring 30, which ring is seated in an annular groove 31, formed in the outer sleeve 23. It is obvious that by turning this lever the wheel 24 may be thrown into more or less frictional engagement with the pulley 18, in accordance with the direction of turning of the lever. Of course when the two clutch members formed by the matching beveled surfaces are thrown into firm frictional engagement the rotation of the pulley 18, by reason of the drive-belt passing therearound, is imparted to the drive-shaft 17. On the other hand, when the frictional engagement of the two beveled surfaces is decreased the pulley is allowed to rotate freely on the drive-shaft without imparting rotation to said shaft.

The lever 27 near its inner end is supported on the horizontal ledge of a bracket 32 and may be releasably secured thereto by means of a pin 33, passed through an opening in the lever and engaging a registering opening in the bracket.

Below the main drive-shaft 17 and supported in suitable bearings 34, extending upwardly from a forward extension of the truck, is a shaft 35. On this shaft is mounted a series of cutting or shredding knives 36 (see particularly Fig. 5) and also a series of breakers 37. The shaft 35 passes through, and the knives and breakers are surrounded by, a casing 38. Secured to the framework and extending into this casing is a fixed knife or shredder 39, which is so positioned that as the knives 36 are rotated with the shaft said knives will, in connection with the fixed knife, effect a shear cut or shred of the material fed into the shredder-casing. Also within the casing 38 and extending downwardly from the top thereof at a rearward incline is a guard or deflecting-board 40, which prevents the shredded material from being forced rearwardly by the knives into the gearing located immediately to the rear thereof. Also on the shaft 35 and near one end thereof is a fan 41, (shown by dotted lines in Fig. 2,) and surrounding this fan is a casing 42. The inner end of this casing is in communication with the casing 38, so that the cut and shredded material in the casing 38 is free to pass therefrom into the casing 42, to be there acted upon by the fan and forced by said fan up a conduit 43, leading from the casing 42 and extending to a place of deposit.

The belt 19, which passes over the pulley 18 of the drive-shaft, is also carried down and around a pulley 44 near one end of shaft 35, and hence the rotation of the main drive-shaft is thereby imparted to shaft 35. On the same end of shaft 35 is a fly-wheel 45.

The top of the frame 16 is open and is made in hopper-like form by the provision of inwardly-inclined boards 46 46, secured to the top of the opposite side pieces of the frame 16. Hinged to the outer edges of these boards are wings 47 47. Depending from and hinged to the under side of these wings are bars 48 48. Each bar passes freely through an eye at the outer end of a bracket 49, and each bar is provided with a series of perforations 50, through any of which a pin 51 may be passed, and which pin is adapted to rest on top of the horizontal arm of the bracket, and thereby hold the wing at adjusted position. In Fig. 6 of the drawings one of the wings is shown raised to a considerable extent and the other wing lowered to its full extent. One of the objects of the wings is to act as protectors for the gearing or other parts therebeneath and adjacent to the outside of the side pieces of the frame 16, serving to prevent the cornstalks when carelessly deposited in the hopper from falling down the outside of the frame and becoming entangled with the gearing or other parts beneath the wings. It frequently happens that the machine is so positioned that it is more convenient to feed the cornstalks to the hopper entirely from one side of the machine. It is for this reason that I provide for the adjustability of the wings. When it is desired to feed the cornstalks in the manner referred to, the wing on the side of the machine from which the feeding is being done is lowered to the required extent to permit the cornstalks to freely enter the hopper, while the opposite wing is raised considerably, so as to provide a guard to prevent the cornstalks which are thrown into the hopper from escaping over that side of the machine.

The hopper is provided with a bottom piece 52, which extends from the rear end of the machine forwardly at a declination. It terminates short of the forward end of the machine, so as to leave an opening 53 of considerable width. At the front edge of the bottom board and projecting downwardly therefrom for a short distance and extending across the frame 16 is a transverse board 54, which acts as a guard to prevent the cornstalks from passing in the first place directly beneath the bottom of the hopper and onto the husking portions of the rolls hereinafter referred to.

Immediately below the front edge of the bottom board 52 and journaled in the side pieces of the frame 16 is a transverse shaft 55. On this shaft are mounted a plurality of saws 56, preferably of circular form. Any desired number of these saws may be employed; but I prefer to employ three of said saws, as shown clearly in Figs. 3 and 6. As will be seen from Fig. 5, both the bottom board 52 and the transverse board 54 are slitted so as not to interfere with the free rotation of the saws. At the outer end of the throat or opening 53 is another transverse shaft 57, which has its bearings in the sides of the frame 16. On this shaft is mounted a single saw 58, also preferably of circular form. The forward end piece of the hopper is slitted, as clearly shown in Fig. 5, so as not to interfere with the rotation of this saw.

Means should be provided for rotating the shaft carrying the saws 56 and the shaft carrying the saw 58 toward each other. The specific means illustrated in the drawings for accomplishing this consists in mounting on the main drive-shaft a sprocket-wheel 59, around which a sprocket-chain 60 passes, which chain leads to and around a sprocket-wheel 61, mounted on the forward saw-carrying shaft 57. Shaft 57 has also mounted thereon another sprocket-wheel 62, around which passes a sprocket-chain 63, which leads to and around a sprocket-wheel 64, mounted upon a laterally-projecting stud 65. This stud has also mounted thereon a toothed wheel 66, which is in mesh with a similar wheel 67, mounted on the inner saw-carrying shaft 55. From the connection described it will be evident that the two saw-carrying shafts are compelled to rotate toward each other or in the direction of the arrows shown in Fig. 5.

Arranged longitudinally in the hopper and at a desired distance below the saws and extending from the front end of the hopper rearwardly at an incline are a series of husking-rollers. In the accompanying drawings I have shown four of these rollers and have indicated the outer rolls by the numerals 68 68 and the inner rolls by the numerals 69 69. The forward ends of these rolls are the separating portions thereof—that is to say, at these portions of the rolls the cornstalks are separated from the ears. The forward separating portion of each roll is tapered, the taper being toward the forward end of the machine, and on the tapered portion each roll is provided with diametrically opposite outstanding annular beads or ribs 70. The ends of the ribs of each diametrically opposite pair do not quite meet, so that slight spaces are left between said ends. The outer rolls 68 from the inner ends of the tapered portions rearwardly are smooth and from points thereof approximately beneath the inner saws and to the rear ends thereof are provided with a suitable number of projecting husking-pins 71. The inner rolls 69 are provided along their surfaces, commencing at a point just back of their tapered forward ends and continuing rearwardly throughout the length of said rolls, with series of elongated grooves or recesses 72, preferably two series, located diametrically opposite each other and extending diametrically partly around the rolls. The inner rolls are also provided with elongated recesses 73, extending lengthwise of said rolls and commencing at the forward tapered ends and continuing about the distance of the length of the throat or opening 53 of the hopper. These recesses are adapted for the accommodation of elongated nippers 74, arranged lengthwise of the outer rolls 68 and positioned correspondingly to the location of the recesses 72 and of a corresponding length to said recesses. In view of the provision of the recesses 73 it is necessary that the elongated recesses 72 on this portion of the rolls 69 should be opposite to the position of said recesses 72 on the remaining portion of said rolls, as clearly indicated in Fig. 5. The ribs 70 at the forward tapered end of each roll tend to pull the cornstalks between the rolls and permit said stalks to work down to the more contracted spaces between the rolls, the final separation of the stalks from the ears being accomplished by means of the nippers 74. As is usual in this class of machines, the ears of corn which are thus severed from the stalk slide down the rolls onto the husking portions thereof and are there acted upon by the husking-pins 71 of the outer rolls and stripped of their husks, the said pins in the revolution of the outer rolls passing into the recesses 72. The cornstalks which are severed from the ears and which pass between the rolls are subjected to the operations hereinafter more fully set forth.

The husking-rolls are rotated through the medium of the following gearing: On the main drive-shaft is a beveled gear 75, which meshes with a similar gear 76 at the end of the journal of one of the rolls. The opposite journals of all of said rolls carry intermeshing gear-wheels 77. It follows that when the beveled gear 76 is rotated by the rotation of the beveled gear 75 all of the several corn-husking rolls will be rotated by reason of the intermeshing gears 77.

To provide for the ears of corn arranging themselves singly upon the husking portions of the rolls instead of piling one upon the other, I provide two swinging or pivoted plates 78 and 79, which are mounted to swing on transverse shafts 80 and 81. It is evident that should the ears arrange themselves one on top of the other when said ears contact with the swinging plates referred to said plates will have a tendency to retard the uppermost ears and allow the under ear to first slide along the husking portions of the rolls. To provide positively for the accomplishment of this, I prefer to provide intermediate of the two swinging plates a series of radiating fingers 82, disposed along the length of and mounted to rotate with a shaft 83. Rotation is imparted to this shaft by means of a crossed belt 84 passing around a pulley 85 on the shaft 83 and also around a pulley 86 on the shaft on the inner saw-carrying shaft.

The rear ends of the husking-rolls project through an opening 87 in the rear end piece of the frame and are supported in suitable bearings. This opening is large enough to permit the husked ears to readily pass therethrough. If no means were provided to guard against it, the husked ears of corn might lodge and collect on these bearings of the rolls. I therefore provide mechanism for preventing this, consisting of a series of beater-arms 88, arranged along and extending from a transverse shaft 89. The beater-arms extend into the opening 87 and the shaft 89 is rotated in a direction to cause the arms to beat or carry the ears outwardly, and thereby prevent said ears from collecting on the rear bearings of the rolls. The shaft 89 is preferably rotated by means of a sprocket-chain 90 passing around a sprocket-wheel 91 on said shaft and extending upwardly and around a similar sprocket-wheel 92 on the inner saw-carrying shaft. The beater-arms furthermore act as a guard to prevent a person from running his fingers in through the opening 87 and becoming caught by the rotating rolls. Extending over the beater-shaft is a curved hood 93, which prevents the ears of corn caught by the beater-arms from flying upwardly.

The ends of the husking-rolls are journaled in suitable bearings at the front and rear of the frame 16. It frequently happens that hard substances get in between the husking-rolls, and hence it is desirable that the bearings of said rolls should be yielding. I therefore mount the front journals of three of the rolls and the corresponding rear journals of said rolls in laterally movable or yielding bearings. The bearings for the forward journals are shown in detail in Fig. 10. The forward journals of both the outer rolls are movable, and the forward journal of one of the inner rolls is also movable. The movable journals for the outer rolls are indicated by the numerals 94 94 and the movable journal of one of the inner rolls by the numeral 95. The forward journal of the other inner roll is mounted in a fixed bearing 96. It will be understood that the bearings for the rear journals of the rolls are similar to the front bearings just described and wherever they show in the drawings are designated by the same reference-numerals. The movable bearings for the forward journals of one of the outer rolls and the adjacent inner roll work in a guide-slot 97, and the movable bearing for the journal of the other outer roll works in a guide-slot 98, (see Fig. 10,) the upper wall of said slots being formed by an arch-shaped piece 99. The outer sides of the movable bearings for the front journals are provided with depending lugs 100, which fit against the outer side of the framework, and hence the rolls are prevented from longitudinal play rearwardly. The movable bearings for the rear journals are guided in their movement by means of depending hook-like projections 101, which extend beneath the framework, as clearly shown in Fig. 5, said hook-like projections also serving to prevent the rear ends of the rolls from jumping upwardly. The outer movable bearings for the journals at both the front and rear ends of the rolls are pressed against by rubber buffers 102 102, and the degree of pressure of these buffers is regulated by means of set-screws 103 103. It will be evident from the construction described that should any hard substances get in between the rolls said rolls will yield laterally, and thereby permit said substances to pass therebetween without danger of damage to any of the parts.

Below the husking-rolls is an endless conveyer 104, which is preferably arranged at a gradual incline from the rear end of the machine forwardly. The belt may be of any suitable form, but preferably consists of endless sprocket-chains connected by transverse slats, as shown. The belt passes around two rollers 105 and 106, arranged, respectively, at opposite ends of the machine, said rollers provided with sprocket-teeth for the engagement therewith of the sprocket-chains of the endless conveyer. The upper portion of the endless conveyer passes over a slatted platform 107 and the lower portion thereof over a solid platform or flooring 108. The journals of the rear roller 106 of the endless conveyer 104 are preferably mounted in an adjustable bearing-box 109, movable in a guideway 110, the adjustability being secured by means of an adjusting-screw 111. By this provision any slack which may occur in the conveyer may be readily taken up. The means for driving the endless conveyer consists of an endless sprocket-chain 112, which passes around a sprocket-wheel 113, mounted on the drive-shaft 17, and also around a sprocket-wheel 114, mounted on a transverse shaft 115. This shaft has also mounted thereon a toothed pinion 116, which gears into a larger toothed wheel 117, mounted on one of the end journals of the forward roll 105 of the conveyer. By this connection the endless conveyer is positively driven.

Arranged in the space between the forward end of the conveyer 104 and the mouth or opening of the shredder-casing 38 are two feed-rolls 118 and 119, the latter being arranged immediately above the former. Both rolls are provided longitudinally with ribs, as shown most clearly in Fig. 1, and which ribs serve to crush the material passing between the rolls. The journals of the upper feed-roll are preferably mounted in movable or yielding bearing-boxes 120, movable in guideways similar to 121 and being held downwardly yieldingly by a coiled spring 122, acting against the upper side of the bearing. The upper roll is permitted by this construction to yield upwardly, and thereby permit said roll to regulate itself to inequalities in the material fed therebetween. The two feed-rolls are rotated in a direction to carry or feed the material passing therebetween into the shredder-casing. This is accomplished by a system of gearing shown most clearly in Fig. 1. A toothed wheel 117' on the journal of the forward roll 105 of the conveyer 104 meshes with a toothed wheel 123 on a shaft 124. This toothed wheel 123 in turn meshes with a pinion 125 on the extended journal of the lower feed-roll, and thereby causes the rotation of said lower feed-roll. The rotation of the lower feed-roll is imparted to the upper feed-roll by means of intermeshing toothed wheels 126 and 127, arranged, respectively, on the journals of said rolls.

At the rear edge of the solid platform 108, which is located beneath the conveyer 104, and extending transversely of the machine is a shaking-trough 128, having a perforated bottom formed of wire screen or into a series of open meshes or perforations. This trough is suspended from pivoted hangers 129 and 130. (See Fig. 6.) The former hanger is secured at its lower end fixedly to the trough, while the latter hanger is pivotally connected to the end of the trough. The trough is on a gradual decline toward its discharge end, as most clearly shown in Figs. 4 and 5. The trough is adapted to have a shaking or agitating movement imparted thereto by any desirable mechanism. In the drawings I show a special form of mechanism for this purpose, consisting of an arm 131, which is pivoted at its inner end to the under side of the trough. The outer end of this arm is pivotally connected to the long arm of a bell-crank lever 132. The short arm of this bell-crank lever has pivoted thereto a link 133, and the upper end of this link is connected to a wrist-pin extending from a crank-disk 134. This crank-disk is mounted on a short stub 135, and this stub has also mounted thereon a pinion 136, which pinion is in mesh with a large toothed wheel 137 on the end of shaft 89. From this connection it will be evident that the rotation of shaft 89 is imparted to stub 135 and this causes rotation of the crank-disk 134, and consequently a reciprocating movement is imparted to link 133, and through the connected bell-crank lever 132 a back-and-forth motion is given to arm 131, and consequently the trough 128 is shaken or agitated. The stub 135 has also mounted thereon a sprocket-wheel 137′, and around this sprocket-wheel passes a sprocket-chain 138, which chain also passes around a sprocket-wheel 139 on the shaft 140 of an endless carrier 141.

The trough 128, as stated, extends across the machine, and its discharge end leads into the casing 142 of an endless conveyer 143. This endless conveyer may be of any desired form; but I prefer to employ merely a single sprocket-chain having a series of transverse slats connected at a medial point thereto, as most clearly shown in Fig. 7. The chain at the lower end of the casing passes around an idle sprocket-wheel 144, mounted on a stud 145, and at the upper end of the casing the chain passes around a sprocket-wheel 146, mounted on a short shaft 147. On one of the outer ends of shaft 147 is a sprocket-wheel 148, and around this sprocket-wheel passes a sprocket-chain 149. Chain 149 leads to and around a sprocket-wheel 150 on shaft 57. By this connection the conveyer 143 is positively driven. On the opposite end of shaft 147 is a belt-wheel 151, around which passes an endless belt 152, said belt leading to and around a small belt-wheel 153 on a shaft 154. This shaft is surrounded by a fan-casing 155, the end of said casing provided with a series of openings 156 for the ingress of air. The fan is of the ordinary construction—that is, consists of a series of blades or wings 157, radiating from the shaft and inclosed by the casing. The fan-casing has extending therefrom a pipe or conduit 158, which leads to the upper forward end of the conveyer-casing 142. Arranged just within the upper forward end of the conveyer-casing 142 are a series of longitudinally-disposed slats or fingers 159. (See Figs. 7 and 8.) These slats or fingers extend over a conduit 160. This conduit is provided on opposite sides and at its lower end with hooks 161 161, to which a bag (not shown) may be connected. Just in advance of the conduit is a box-like structure 162, which is provided with an inclined bottom forming a slide, as most clearly shown in Figs. 2 and 8. The front of this box-like frame is open, and the lower end thereof leads to and is adapted to discharge upon the endless conveyer 104.

As will be seen from Figs. 6 and 9 of the drawings, the upper portion of the box-like frame 16 converges to the husking-rolls, the converging being effected by the provision of inclined inner boards 163 163, leading down to and directly above the outer husking-rolls. Over the center of the inner rolls is a deflecting and separating bar 164, having its opposite sides inclined. By this arrangement the cornstalks deposited in the hopper are separated, and the separated portions are guided, respectively, to the two pair of rolls.

In the operation of my invention rotation is imparted to the main shaft 17, and this through the described connections and gearing causes movement to be imparted to the several rotatable and movable portions of the machine. Tied bundles of cornstalks are fed into the hopper in the manner hereinbefore described with the ears of cornstalks pointing toward the rear of the machine. The rotation of the saws 56 will effect the cutting of the band or cord of a bundle, while the rotation of the saw 58 toward the saws 56 tends to thrust the bundle downward through the throat or opening 53 with the ears of the cornstalks uppermost and at the same time separate or divide the entangled cornstalks. The saws 56 also tend to assist in thrusting the cornstalks downwardly through the opening 53. The annular ribs 70 of the upper or forward ends of the husking-rolls grasp the cornstalks and carry them between the rolls and also to the more restricted spaces between these portions of the rolls and toward a vertical or upright position. The nippers 74 now come into play and sever the stalks from the ears, and the stalks so severed drop onto the conveyer-belt 104 and are conveyed thereby to and between the feed-rolls 118 and 119 and thence to the cutting and shredding mechanism, where they are acted upon by the knives and beaters, which cut and tear the stalks into shreds, and these cut or shredded portions are drawn into the fan-casing 42, where they are acted upon by the fan and forced up the conduit 43 to the place of delivery. The ears of corn are of course left on the top surfaces of the husking-rolls and slide down said rolls, but before leaving the rear ends thereof are acted upon by the husking-pins 71, and thereby stripped of their husks, the said husks passing between the rolls and being caught by the conveyer 104 and carried thereby between the feed-rolls 118 and 119 and thence to the cutting and shredding mechanism and after being cut and shredded pass into the fan-casing, where they are acted upon by the fan and forced upwardly in the conduit 43. The recesses 72 of the husking-rolls serve to split the points of the nubbins of the ears. The husked ears pass off the rear ends of the rolls and onto the conveyer 141, by which they are carried to any suitable point of delivery. If in the operation of husking any corn should be shelled from the ears and pass between the rolls, said shelled corn will fall onto the slatted platform 107 and thence pass through the interstices or openings of said platform onto the solid platform or flooring 108. The shelled corn thus deposited on the platform or flooring 108 is caught by the slats of the conveyer 104 and carried along and deposited thereby into the trough 128. As a shaking or agitating movement is imparted to this trough, dirt or sediment is separated from the shelled corn and permitted to pass through the screened bottom of the trough. In view of the fact that the trough is inclined the kernels of corn slide down the inclined bottom into the conveyer-casing 142 and are carried along said casing by the conveyer 143, and when they reach the upper forward end of said conveyer they encounter the air-blast from the fan 157, which blast serves to blow the lighter particles over the fingers 159 and into the box-like structure 162. These lighter particles then pass down the inclined slide 162 of said box-like structure and thence onto the slats 107 and carried into the cutter and shredder casing. The kernels of corn which are carried along the conveyer-casing 142 and which are heavy enough to resist the air-blast when they reach the fingers 159 pass through the spaces between said fingers and into the conduit 160 and thence into the bag which is connected to the lower end of said conduit, while any kernels of corn which may accidentally pass over the fingers 159 will be again carried through the same course until they are finally deposited in the bag.

In case ensilage is fed into the hopper and where the ears on the ensilage-stalks are to be separated from the stalks and husked the machine remains as shown in the accompanying drawings. In some cases it is desirable in the case of ensilage to cut up the ears as well as the stalks. In such cases in my machine all that is necessary to be done is to remove the several husking-rollers.

While in the foregoing description I have described sprocket-chain connections for transferring rotation and in other instances plain belts passing around pulley-wheels, yet I do not wish to be understood as restricting myself specifically thereto, inasmuch as other desirable and common means for transferring rotation from one part to another may be substituted therefor without departing from the spirit and scope of my invention.

What I claim as my invention is—

1. In a corn-husker, the combination of a hopper, husking-rolls arranged longitudinally therein and supported in suitable bearings at the front and rear of the machine, means for rotating said rolls toward each other, a shaft above the lower discharging ends of the rolls, said shaft provided with a series of projecting arms, and means for rotating said shaft in a direction to compel the arms to act on the ears of corn which travel along the rolls and sweep said ears off the rear bearings of the rolls.

2. In a corn-husker and ensilage-cutter, the combination of a hopper, husking-rolls arranged longitudinally therein, means for rotating said rolls toward each other, a disintegrating device, a slatted platform below the husking-rolls, a solid platform below the slatted platform, an endless conveyer passing over the two platforms, and adapted for conveying material passing between the rolls and caught by the slatted platform to the disintegrating device, and a shaking-trough at one end of the conveyer, and provided with a perforated or reticulated bottom, said trough adapted to receive the material which passes through the slatted platform and falls on the solid platform, the said material being carried by the conveyer over the solid platform to the trough.

3. In a corn-husker and ensilage-cutter, the combination of a hopper, husking-rolls arranged longitudinally therein, means for rotating said rolls toward each other, a disintegrating device, a slatted platform below the husking-rolls, a solid platform below the slatted platform, an endless conveyer passing over the two platforms and adapted for conveying material passing between the rolls and falling onto the slatted platform to the disintegrating device, a shaking-trough at one end of the conveyer and provided with a perforated or reticulated bottom, said trough adapted to receive the material which passes through the slatted platform and falls onto the solid platform, the said material being carried by the conveyer from the solid platform to the trough, a movable conveyer to which the material is conducted by the trough, and means for discharging the lighter particles of the material from said conveyer and conducting said particles back to the slatted platform, means acting on the material carried by said conveyer and adapted for separating the lighter particles from the heavier, and means for conducting said separated heavier particles to a place of deposit.

In testimony whereof I affix my signature in presence of two witnesses.

AUGUST ROSENTHAL.

Witnesses:
A. L. MORSELL,
ANNA V. FAUST.